No. 812,736. PATENTED FEB. 13, 1906.
T. GLADISH.
CORN HARVESTER AND HUSKER.
APPLICATION FILED JUNE 21, 1905.

Witnesses
Edwin G. McKee
Geo Ackman

Inventor
Theodore Gladish
By Victor J. Evans
Attorney

No. 812,736. PATENTED FEB. 13, 1906.
T. GLADISH.
CORN HARVESTER AND HUSKER.
APPLICATION FILED JUNE 21, 1905.

Witnesses
Edwin F. McKee
Geo Ackman

Inventor
Theodore Gladish
By Victor J. Evans
Attorney

UNITED STATES PATENT OFFICE.

THEODORE GLADISH, OF PETERSBURG, INDIANA.

CORN HARVESTER AND HUSKER.

No. 812,736.

Specification of Letters Patent.

Patented Feb. 13, 1906.

Application filed June 21, 1905. Serial No. 266,302.

*To all whom it may concern:*

Be it known that I, THEODORE GLADISH, a citizen of the United States, residing at Petersburg, in the county of Pike and State of Indiana, have invented new and useful Improvements in Corn Harvesters and Huskers, of which the following is a specification.

This invention relates to a corn harvester and husker designed to be moved through a field of corn and strip the ears of corn from the rows of stalks, the device acting to gather the ears, leaving the stalks standing, and to husk the gathered ears.

The object of the invention is to provide a combined harvester and husker of this character which may be attached for use to an ordinary wagon, which will deliver the husked ears into the wagon box or bed, which will separate the shelled kernels of corn from the husks, and which will operate rapidly and efficiently.

With this and other objects in view the invention consists of the features of construction, combination, and arrangements of parts hereinafter fully described, reference being had to the accompanying drawings, in which—

Fig. 3 is a transverse section on the line 3 3 of Fig. 2.

Referring now more particularly to the drawings, the numeral 1 represents the box or body of a wagon of any ordinary construction, and 2 one of the rear wheels thereof, which is employed as a driving-wheel for the operation of the gathering and husking mechanism, as hereinafter described.

The harvester and husker comprises an attachment which is adapted to be secured to the body or box 1 alongside or in close juxtaposition to the driving-wheel 2 and to be detached from the box or body after the harvesting operation has been performed. In the embodiment of the invention disclosed in the present instance I provide a pair of parallel frame-bars 3 and 4, which are disposed horizontally, or substantially so, and are provided at their forward ends with divergent guiding and supporting arms 5 and 6, forming a flaring entrance for the passage of the stalks of corn into the space between the bars 3 and 4, which space forms a guide-passage leading to the stripping or snapping rolls. Associated with the arms 5 and 6 and supported thereby in the manner hereinafter described are gathering-chains 7 and 8, which engage and conduct the stalks of corn as the device advances along a row of corn to the said guide-passage, the chains being of the sprocket type and provided with gathering-fingers 9.

The bars 3 and 4 are connected at their rear ends to a vertical frame 10, supported from the outer side of a rearwardly-inclined frame 11, supporting the husking-rolls, as hereinafter described, and said frame 10 is provided with a horizontal top portion 12, carrying stationary and pivoted bearing-arms 13 and 14, in which are journaled the upper ends of the stripping and snapping rolls 15 and 16, which rolls are connected to turn in unison through the medium of intermeshing gears 17, secured to the upper ends thereof, as clearly shown in Fig. 2.

The lower end of the shaft of the roll 15 is journaled in a bearing-bracket 18, fastened to the outer side of the frame 11, while the lower end of the shaft of the roll 16 is journaled in a bearing-arm 19, pivotally secured to the outer frame-bar 4. The bearings for the roll 15 are stationary, while movement of the roll 16 toward and from said roll 15 is permitted through the pivotal mounting of the bearing-arms 14 and 19. Passing through the arms 13 and 14 and the outer side of the head portion 12 of the frame 10 is a bolt 20, on which is a spiral spring 21, disposed between the frame portion 12 and the arm 14 and normally serving to press said arm inward, while connected with the lower bearing-arm 19 is a guide-bolt 22, connected with the frame-bar 4 and between which and said arm 19 is a coil-spring 23. The two springs 21 and 23 normally serve to force their respective bearing-arms 14 and 19 inward, so as to urge the roll 16 toward the roll 15, this construction permitting the rolls to accommodate themselves to different sizes of stalks, as will be readily understood. The frame 10 is stayed and braced from the bars 3 and 4 by a substantially U-shaped bracing member 24, connected at its bend or return portion to the front of the top portion 12 of said frame 10 and having its arms bolted or pivoted to the bars 3 and 4 at a point adjacent to the forward ends thereof.

Journaled in the bearings 25 at the rear of the frame 11 is a transverse main drive-shaft 26, carrying at its inner end a sprocket-wheel 27, connected by a sprocket drive-chain 28 to the master sprocket-wheel 29, fastened to the hub of the drive-wheel 2. The sprocket-wheel 29 is provided upon its hub portion with a series of radially-arranged clamps 30 to engage the hub of wheel 2, said clamps being actuated and held in clamping position by set-screws 31, thereby fastening said sprocket-wheel to the hub.

The sprocket-wheel 27 is adapted to be thrown into and out of engagement with the shaft 26 by a clutch device 33, operable by a suitable actuating lever or member 34, mounted upon the outer side of the frame 11, whereby the operating mechanism of the harvester and husker may be thrown into and out of action at will. The shaft 26 carries at its outer side a bevel-gear 35, meshing with a similar gear 36 on the rear end of an auxiliary drive-shaft 37, arranged longitudinally on the outer side of the frame 11 and below the frame 10 and frame-bars 3 and 4. The shaft 37 also carries a bevel-gear 38, meshing with the bevel-gear 39 on the lower end of the shaft of the stationary snapping-roll 15, whereby said roll with its companion roll 16 is driven. At the forward end of the shaft 37 is another bevel-gear 40, meshing with the bevel-gear 41 on a stub-shaft 42, journaled in a bearing-bracket fixed to the frame-bar 3 at its point of junction with its guiding and supporting arm 5, which arm carries at its outer end a bearing for a stub-shaft 43. On the shafts 42 and 43 are mounted sprocket-wheels 44 and 45, which support and drive the short gathering-chain 7, which coöperates with the gathering-chain 8 of the inner stretch of the guide-passage between the frame-bars 3 and 4, by which they are guided or conducted to the snapping-rolls 15 and 16 as the machine advances along a row of corn in the field. The outer gathering-chain 8 is considerably longer than the chain 7 and is guided and supported by sprocket-wheels 46, 47, and 48, mounted, respectively, upon the outer end of the arm 6 at the point of junction of said arm with the frame-bar 4 and upon the lower end of the shaft of the outer snapping-roll 16. The chain 8 thus receives motion from the roll 16 and is driven through the intervening gearing at the same rate of speed as the wheel 2, so as to prevent the stalks of corn from being uprooted in the operation of the machine. An automatic tightener 49 of any preferred construction may be provided upon the frame-bar 4 to take up any excess slack in the chain 8.

The acting surfaces of the rolls 15 and 16 terminate above the plane of the upper portion of the adjacent outer side of the frame 11, so as to provide for the proper feed of the detached ears to the husking-rolls and passage of the stalks through the snapping-rolls without interference.

The stalks feeding rearwardly through the guide-passage between the bars 3 and 4 to the snapping-rolls are held in position by the fingers on the inner stretch of the gathering-chain 8, and in order to secure the proper feed of said stalks through the snapping-rolls it is essential to provide means for guiding the working stretch of said chain and maintaining the fingers thereof adjacent the snapping-rolls in horizontal position to support the ears of corn detached from the stalks by the rolls, so that an effective feed of the same to the husking-rolls mounted in the frame 11 may be insured. To this end the outer face of the working stretch of chain 8 is arranged to bear against and move in contact with the inner edge of a guide-board 50, said board being movably connected at its forward end to the front end of the bar 4, as indicated at 51, and suitably secured at its rear end to the lower end of the movable snapping-roll 16 or its bearing, whereby said board is adapted to move with said roll to adapt the chain to adjust itself to the action thereof and the rolls to effectually adjust themselves to receive different sizes of stalks. The fingers of the working stretch or chain 8 move over the upper surface of a shifting delivery-board section 52, arranged to partially cross the feed-passage between the bars 3 and 4 from a point adjacent the front end of said passage to the snapping-rolls, thus adapting said fingers to receive and support the detached ears dropping from the roll and prevent the same from dropping down through the feed-passage. The delivery-board section 52 is provided with a vertical flange 53, adjustably mounted on guide bolts or stems 54, secured to the outer upper portion of the frame 11, said section being controlled in action by springs 55, surrounding said bolts, whereby said section 52 is normally projected outward to a prescribed position and is permitted to have inward movement under the pressure of abnormally large stalks to permit the same to pass freely to the snapping-rolls. The movable delivery-board section 52 slides over and in contact with a fixed delivery-board section 56, secured to the top portion of the outer side of frame 11, said board-section being inclined, so as to direct the falling ears of corn from the gathering-chain 8, so that they will feed by gravity to the interior of the frame 11. A stationary inclined fender or guide-board 57 is supported by the frame 10, so as to prevent the ears from dropping outside the frame and guide them to the supported fingers of the chain 8, whence they pass to the delivery-board.

The arm 5 and rear end of the frame 11 are fastened to the adjacent side of the wagon box or body by guy-rods 58 and 59, each of which is composed of sections adjustably connected by a turnbuckle 60, and the attachment is supported at its outer side by a wheel or roller 61, journaled in the lower end of a hanger 62, carried by the frame 10. The front portion of the frame 11 is provided with an attaching-hook 63, adapted to engage an opening in a special form of cap-nut 64, applied to the spindle of the axle of the wheel 2, the device being thus supported in position upon the wagon box or body 1, so as to be drawn therewith through a field of corn. In thus attaching the frame portion of the harvester and husker to the wagon no modification in the construction of the wagon-box is required, it simply being necessary to employ a special cap-nut 64 for the engagement of the hook 63 therewith.

Figure 1:
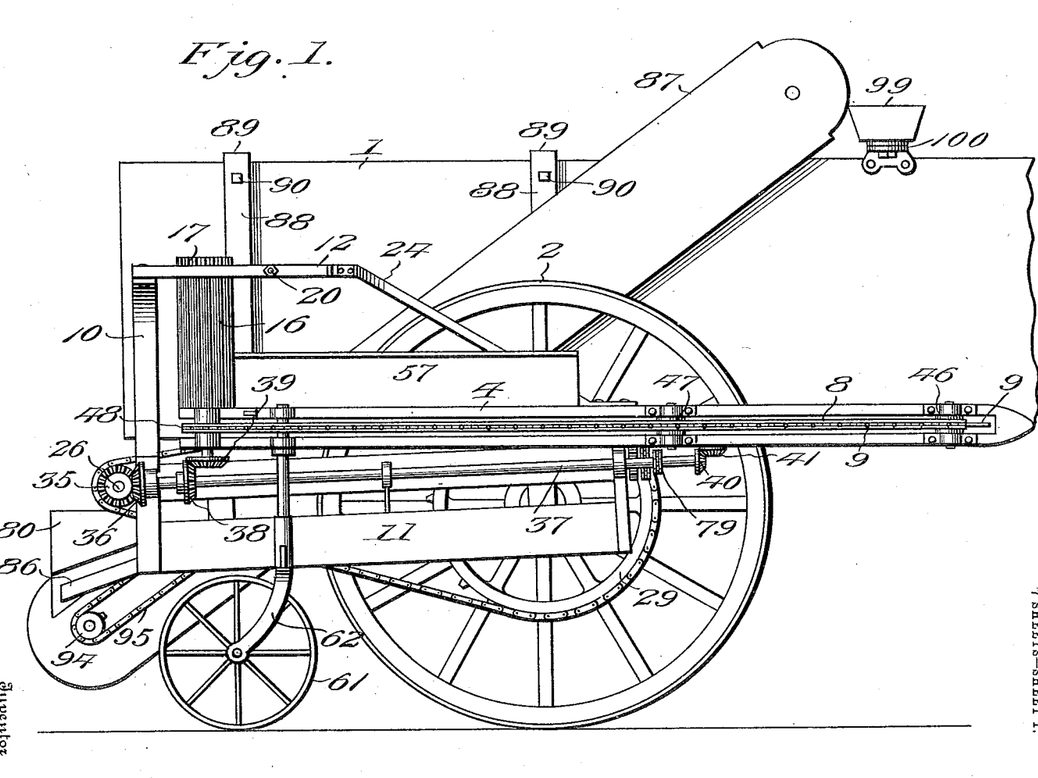
Figure 1 is a side elevation of the harvester and husker, showing the same applied upon the rear portion of the body of a wagon.
Figures 2, 9:
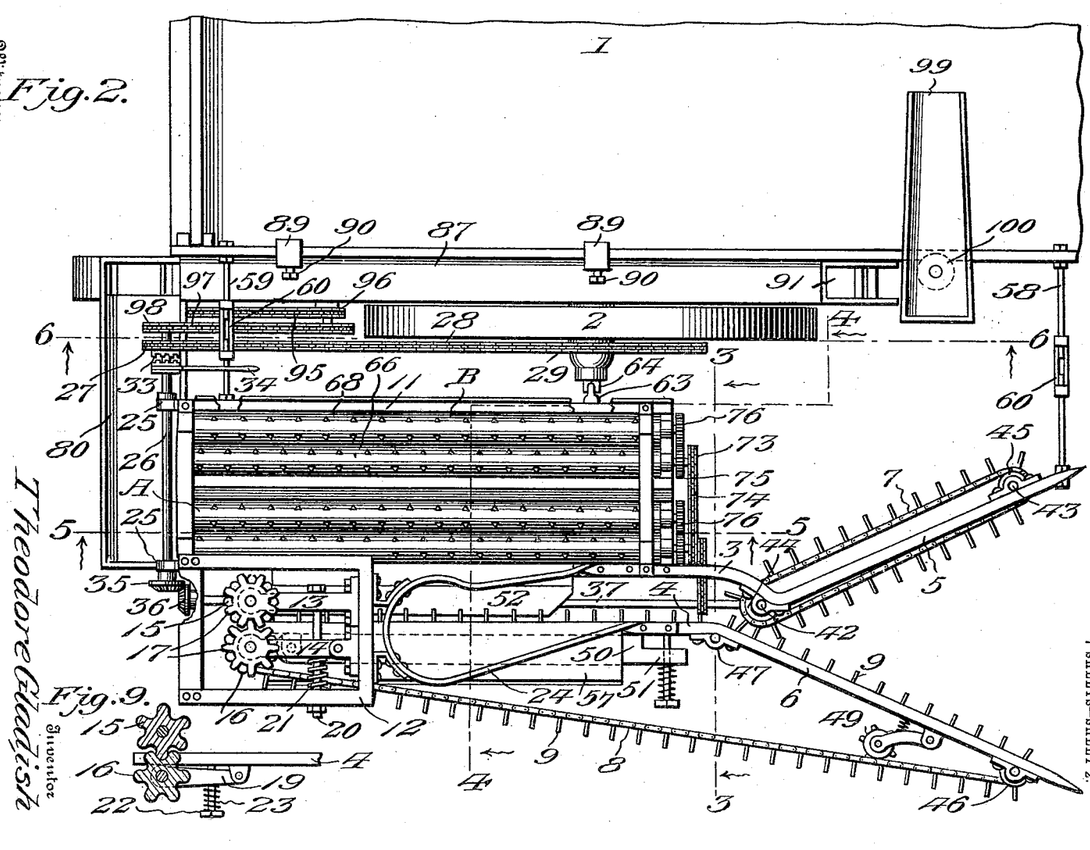
Fig. 2 is a top plan view of the same.
Fig. 9 is a sectional plan view of the stripping and snapping rolls, showing the support for the lower end of the yielding roll.
Figure 4:
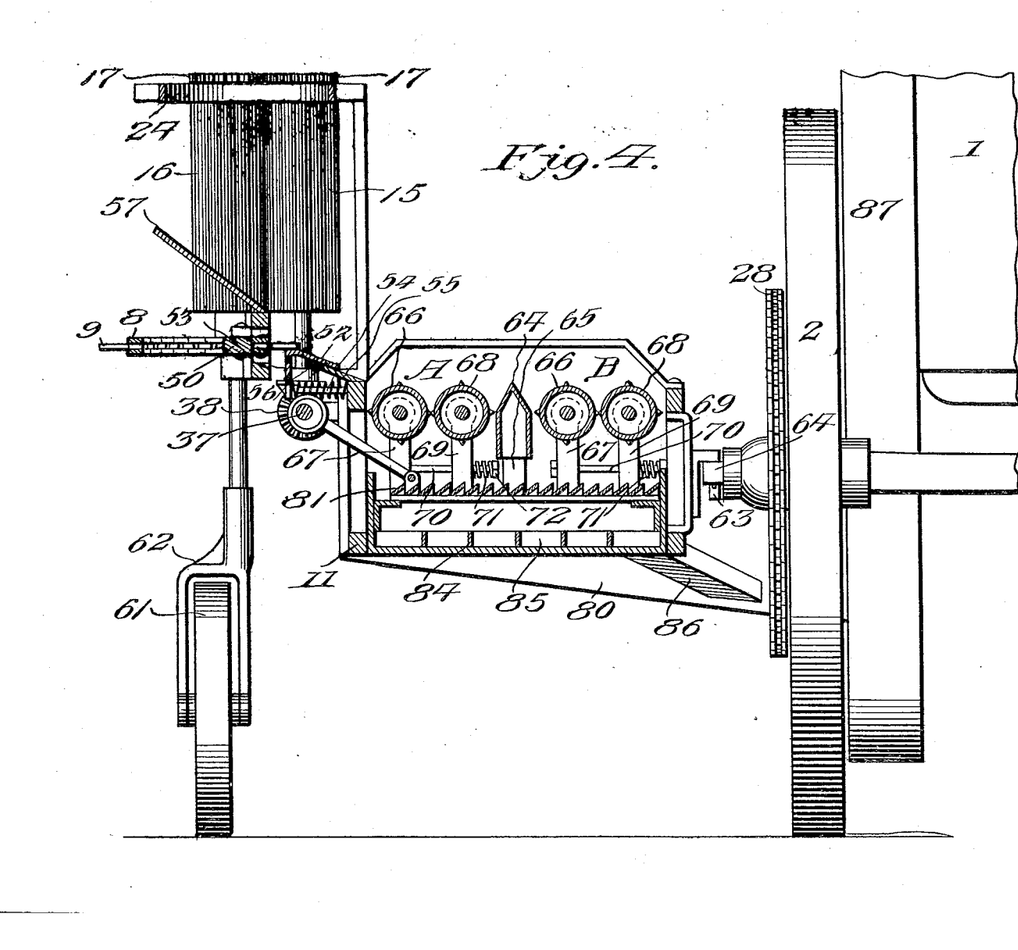
Fig. 4 is a transverse section taken on the irregular line 4 4 of Fig. 2.
Figure 5:
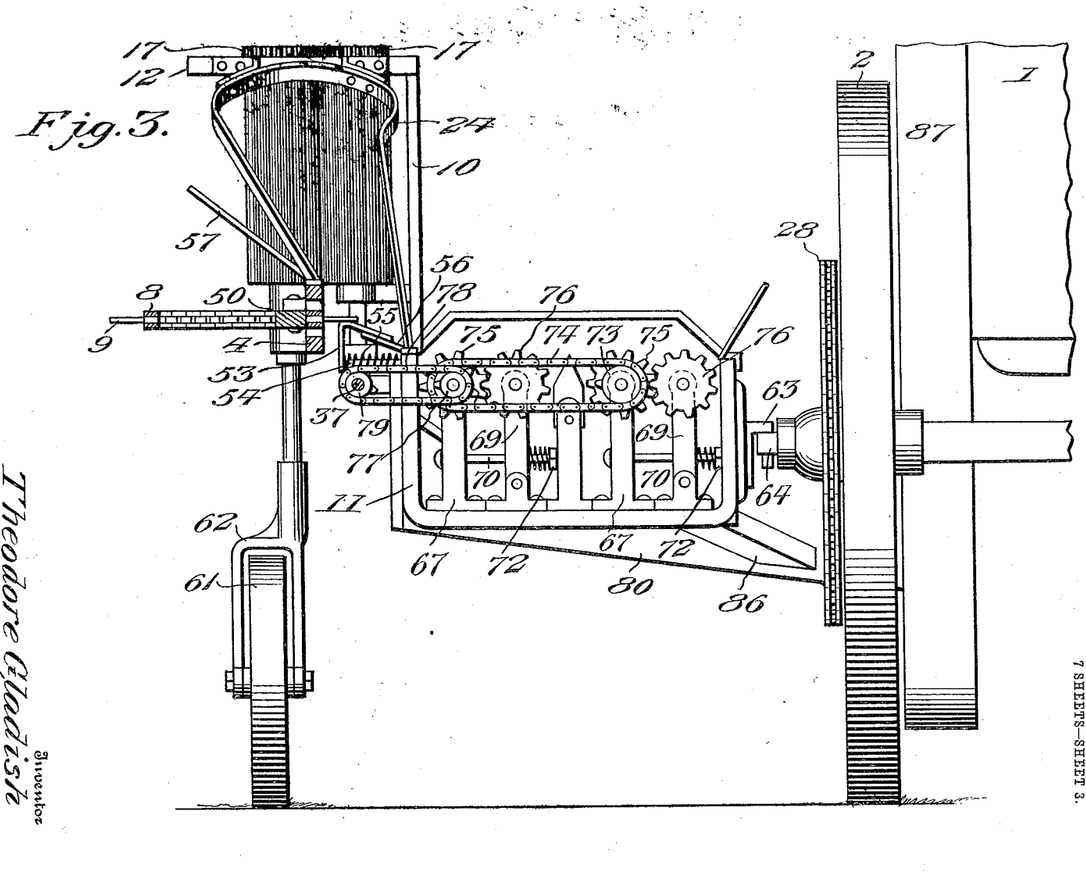
Fig. 5 is a longitudinal section through the husking mechanism of the device, taken on line 5 5 of Fig. 2.
Figure 6:
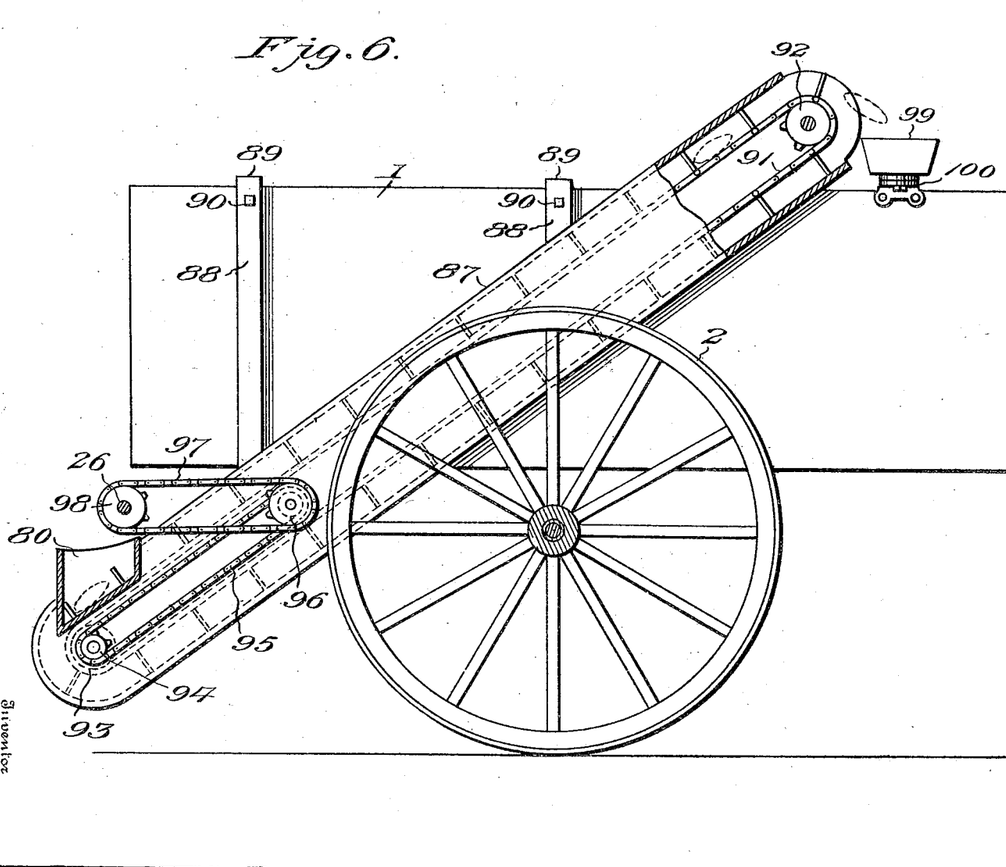
Fig. 6 is a similar section taken on line 6 6 of Fig. 2, showing the endless elevator in elevation and partly broken away to show the construction.
Figure 7:
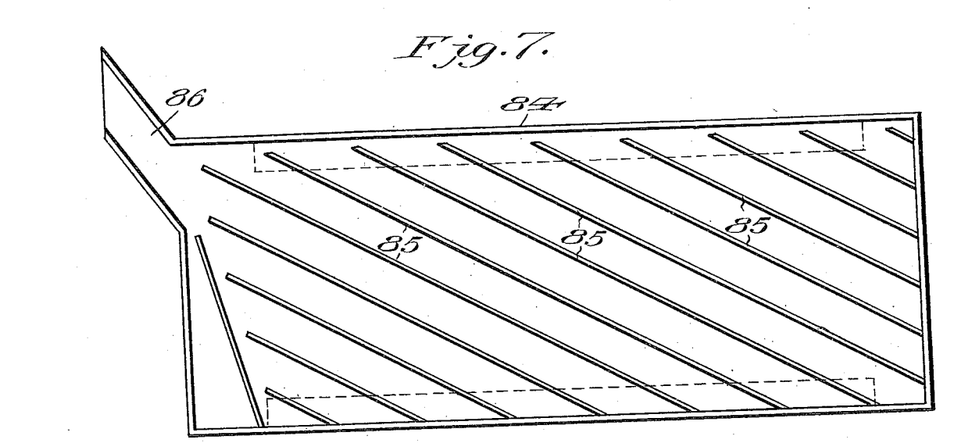
Fig. 7 is a plan view of the grain-pan.
Figure 8:
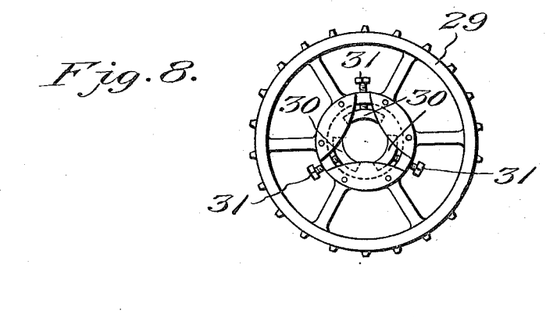
Fig. 8 is a detail view of the master sprocket-wheel.

The frame 11, which may be of any preferred construction, but is preferably of U shape in cross-section, forms a receptacle for the husking-rolls, which are disposed longitudinally therein parallel with the wagon-body, as clearly shown in Fig. 2. In the present instance two pairs of husking-rolls A and B are shown, said pairs being separated by the usual divide-board or guiding-ridge 64, supported above the bottom of the frame upon a standard or arm 65. Each pair of rolls embodies a stationary member 66, journaled to rotate in stationary bearing brackets or standards 67, and a movable or adjustable member 68, journaled in bearings in pivoted supporting-brackets 69. Secured to each stationary bracket 67 is a guide-bolt 70, which passes loosely through the pivoted bracket 69 and carries a pressure-spring 71, which normally forces the movable roll toward the fixed roll and permits its movement away from the same, the bolt being provided with a nut 72 for regulating the resistance of the spring. The forward ends of the shafts of the fixed rolls are provided with sprocket-wheels 73, around which passes a chain 74, connecting said rolls to revolve in unison. Each fixed roll communicates motion to its companion adjustable roll by means of intermeshing gears 75 and 76, respectively carried by said rolls. The shaft of the outer stationary husking-roll also carries a sprocket-wheel 77, which is connected by a chain 78 with a sprocket-wheel 79 on the auxiliary drive-shaft 37, whereby the husking-rolls are driven. These rolls remove the husks from the ears of corn delivered thereto and are arranged to incline downward toward the rear, so that the husked ears of corn will feed by gravity down the same into a conducting trough or chute 80, supported at the rear of the frame 11 and extending transversely at a downward inclination toward the inner side thereof. The husks feed downward through the rolls in the usual manner and fall upon a reciprocatory separator 81, arranged in the frame 11 below the same, said separator being connected by a rod 82 with an eccentric 83 on the shaft 37, whereby motion is communicated thereto. The separator 81 has a screen-surface which will permit of the passage therethrough of any shelled kernels of corn which may be intermingled with the husks, which kernels drop downward into a grain-pan 84. The husks feed downwardly and rearwardly over the surface of the separator, which is inclined to correspond with the inclination of the husking-rolls and discharges through an opening at the rear of the frame 11 onto the ground. The grain-pan 84 is inclined in like manner to the parts above referred to and is provided with a series of diagonally-arranged feed-channels 85, leading to an outlet-spout 86 at the inner rear end of said pan, through which spout the kernels of corn separated from the husks may be delivered into the trough 80 for conveyance to the wagon-body by the elevator, hereinafter described, or conducted into any other suitable receptacle.

Arranged upon the outer side of the wagon-body adjacent to the inner side of the frame 11 is an inclined conveyer frame or case 87, provided with bracket-arms 88 to secure it to the body 1, said arms having hooked ends 89 to engage the upper end of the body and provided with securing set-screws 90. Arranged within the casing 87, which communicates at its lower end with the trough 80, is an endless chain conveyer 91, passing around sprocket-wheels 92 and 93, suitably mounted at the upper and lower ends of said casing. The shaft of the lower sprocket-wheel 93 extends outside of the casing and carries another sprocket-wheel 94, which is connected by a chain 95 with one of the sections of a double sprocket-wheel 96, also mounted on the outside of the casing, the other section of the wheel 96 being connected by a chain 97 to a sprocket-wheel 98, mounted on the main driving-shaft 26, through which chain-and-sprocket gearing motion is communicated to the elevator. The clutch 33 may be arranged to throw both sprocket-gears 27 and 98 simultaneously into and out of operation, so that the gathering, husking, and elevating mechanism may be started and stopped at the same time. The husked ears of corn pass along the spout 80 to the lower end of the conveyer-casing and are elevated by the conveyer 91 to a chute 99, pivotally mounted upon a bearing-bracket 100, secured to the adjacent side of the wagon-body, the pivotal mounting of said chute permitting it to be swung in a horizontal plane to cause the corn to feed toward either end of the wagon-body.

From the foregoing description, taken in connection with the accompanying drawings, the construction, mode of operation, and advantages of the invention will, it is thought, be readily understood without a further description.

Having thus described the invention, what is claimed as new is—

1. A combined corn harvester and husker comprising a frame, husking-rolls carried by the frame, snapping-rolls also carried by the frame and arranged at one side and above the plane of the husking-rolls, gathering mechanism including a gathering-chain provided with fingers for conducting the stalks to the snapping-rolls, means for operating the rolls and chain, and a delivery-board comprising stationary and yielding sections adapted to convey the ears of corn from the gathering-chain on which they fall from the snapping-rolls to the husking-rolls, said yielding section being adapted to support the fingers of the chain, substantially as described.

2. A combined corn harvester and husker comprising a supporting-frame, husking-rolls carried by said frame, snapping-rolls also carried by the frame and arranged at one side and above the plane of the husking-rolls, gathering mechanism for conveying the stalks to the rolls including a chain provided with gathering-fingers, means for operating the rolls and chain, said fingers being adapted to receive the ears of corn separated from the stalks by the snapping-rolls, and a delivery-board for conveying the ears from the chain to the husking-rolls, said board comprising a stationary section and a spring-actuated yielding section adapted to support the chain-fingers adjacent to the snapping-rolls.

3. A combined corn harvester and husker comprising a supporting-frame, husking-rolls carried by said frame, snapping-rolls also carried by the frame and arranged at one side of and above the plane of the husking-rolls, gathering means including a gathering-chain provided with fingers for conveying the stalks to the snapping-rolls, means for operating the rolls and chain, the fingers of the chain being adapted to receive and support the ears of corn detached by the snapping-rolls, and a delivery device adapted to conduct the ears from the chain to the husking-rolls, said delivery device comprising a stationary section, and a movable section in sliding contact therewith, said movable section supporting the fingers of the chain adjacent to the snapping-rolls and having a depending portion, and spring-pressure means acting on said depending portion to maintain the movable section beneath the chain-fingers and to adapt the same to yield for the passage of stalks of different sizes.

4. A combined corn harvester and husker comprising a supporting-frame, husking-rolls horizontally mounted upon the frame, snapping-rolls vertically mounted upon the frame at one side of and above the plane of the husking-rolls, gathering mechanism including a gathering-chain provided with fingers for feeding the corn to the snapping-rolls, said chain being disposed below said rolls with its fingers arranged to catch and support the detached ears, means for operating the rolls and chain, a stationary fender arranged to conduct the ears to the fingers of the chain, and a delivery-board for conducting the ears from said fingers to the husking-rolls, said board having a yielding portion to support the fingers adjacent to the snapping-rolls.

5. A combined corn harvester and husker comprising a supporting-frame having a guide-passage, horizontal husking-rolls arranged upon one side of said passage, vertically-arranged snapping-rolls disposed in line with the passage above the plane of the husking-rolls, gathering mechanism including a gathering-chain provided with gathering-fingers for conducting the corn along said passage to the snapping-rolls, said chain having a working stretch movable along said passage, spring-bearings for movably mounting one of the snapping-rolls, a guiding element for the working stretch of the chain connected to and movable with the movable snapping-rolls and adapted to adjust the working stretch of the chain therewith, means for operating the rolls and chain, the fingers of the chain being arranged to receive the ears detached by the snapping-rolls, and a delivery device supporting said fingers adjacent to the snapping-rolls and adapted to convey the detached ears therefrom to the husking-rolls.

6. A combined corn harvester and husker comprising a supporting-frame having a guide-passage, horizontal husking-rolls arranged upon one side of said passage, vertically-arranged snapping-rolls disposed in line with the passage above the plane of the husking-rolls, gathering mechanism including a gathering-chain provided with gathering-fingers for conducting the corn along said passage to the snapping-rolls, said chain having a working stretch movable along said passage, spring-bearings for movably mounting one of the snapping-rolls, a guiding element for the working stretch of the chain connected to and movable with the movable snapping-roll and adapted to adjust the working stretch of the chain therewith, means for operating the rolls and chain, the fingers of the chain being adapted to catch and support the ears detached by the snapping-rolls, and a delivery-board for conveying the detached ears from the fingers to the husking-rolls, said board having a spring-pressed yielding section to support the fingers adjacent to the snapping-rolls and to regulate the width of the passage adjacent to the snapping-rolls.

7. In a combined corn harvester and husker, a guideway having a flaring entrance, snapping-rolls vertically arranged at the rear end of the guideway, one of said rolls being movably mounted in spring-bearings, a short gathering-chain disposed on one side of the flaring entrance of the guideway, a second gathering-chain having a working stretch extending along the other flaring side of the guideway and continuously along said guideway to the snapping-rolls and connected for operation with the movable snapping-roll, and means for operating said gathering-chains and snapping-rolls.

8. In a corn-harvester, a main frame, a guideway disposed at one side thereof, snapping-rolls arranged at the rear end of the guideway, gathering mechanism for feeding the stalks along the guideway to the snapping-rolls, said mechanism including a chain having a working stretch extending along the guideway and provided with gathering-fingers, said fingers being adapted to receive and support the ears detached by the snapping-rolls, and a delivery-board having a yielding section supporting the fingers and arranged to convey the detached ears therefrom to the main frame.

9. In a corn-harvester, a main frame, a guideway arranged at one side thereof, snapping-rolls arranged at the rear end of the guideway, one of said rolls being yieldably mounted, gathering mechanism including a gathering-chain having a working stretch movable along the guideway and provided with fingers, said chain being connected with and driven from the movable roll with its fingers arranged to catch and support ears detached by the rolls, a guiding element for said working stretch of the chain movable with the movable snapping-roll, and a delivery-board for conveying the detached ears from the chain to the main frame, said board having a yielding section disposed in the guideway and arranged to support the fingers adjacent to the snapping-roll.

10. In a combined corn harvesting and husking apparatus the combination with a wagon having a driving-wheel, of a frame arranged alongside said wheel and supporting gathering and husking mechanism, means for operating said husking and gathering mechanism from the driving-wheel, connections between said frame and the wagon-body, and a detachable connection between the frame and the cap-nut of the axle of the driving-wheel.

11. In a combined corn harvester and husker, the combination of a main frame, husking-rolls mounted therein, snapping-rolls mounted at one side of said main frame, gathering mechanism for conveying the corn to the snapping-rolls, said mechanism including a chain provided with fingers adapted to support the ears detached by the snapping-rolls, drive-gearing, a shaft extending beneath the snapping-rolls and operated by said gearing, said shaft being operatively connected with the rolls and gathering mechanism, a delivery device arranged to support the ear-holding fingers of the chain and convey the ears therefrom to the husking-rolls, a shaking-separator in the main frame below the husking-rolls, and means for operating said separator from the said shaft.

In testimony whereof I affix my signature in presence of two witnesses.

THEODORE GLADISH.

Witnesses:
T. B. BASINGER,
M. G. FOWLER.